(12) United States Patent
Bordes et al.

(10) Patent No.: US 11,711,512 B2
(45) Date of Patent: *Jul. 25, 2023

(54) METHOD AND APPARATUS FOR VIDEO ENCODING AND DECODING USING PATTERN-BASED BLOCK FILTERING

(71) Applicant: InterDigital VC Holdings, Inc., Wilmington, DE (US)

(72) Inventors: Philippe Bordes, Cesson-Sevigne (FR); Philippe De Lagrange, Cesson-Sevigne (FR); Edouard Francois, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,354

(22) Filed: Nov. 1, 2021

(65) Prior Publication Data

US 2022/0086437 A1 Mar. 17, 2022

Related U.S. Application Data

(63) Continuation of application No. 16/645,468, filed as application No. PCT/US2018/049733 on Sep. 6, 2018, now Pat. No. 11,190,765.

(30) Foreign Application Priority Data

Sep. 8, 2017 (EP) ..................................... 17306162

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/174* (2014.11); *H04N 19/176* (2014.11); *H04N 19/70* (2014.11); *H04N 19/80* (2014.11)

(58) Field of Classification Search
None
See application file for complete search history.

(56) References Cited

U.S. PATENT DOCUMENTS 5,124,794 A 6/1992 Rabii et al.
6,125,201 A 9/2000 Zador et al.
(Continued)

FOREIGN PATENT DOCUMENTS

EP 1530829 B1 8/2018
WO WO 2008016605 A2 2/2008

OTHER PUBLICATIONS

Xu, et al., "Overview of the Emerging HEVC Scren Content Coding Extension", IEEE Transactions on Circuits and Systems for Video Technology, vol. 26, No. 1, Jan. 2016, 13 pages.
(Continued)

*Primary Examiner* — Stefan Gadomski
(74) *Attorney, Agent, or Firm* — Condo Roccia Koptiw LLP

(57) ABSTRACT

Methods (1100, 1300) and apparatuses (600, 1200) for video coding and decoding are provided. The method of video encoding includes accessing (1110) a reconstructed block corresponding to a block in a picture of a video, determining (1120) at least one filter pattern based on a property of the block and filtering (1130) the reconstructed block according to the at least one filter pattern. The method of video decoding includes accessing (1310) a reconstructed block corresponding to a block in a picture of an encoded video, determining (1320) at least one filter pattern based on a property of the block and filtering (1330) the reconstructed block according to the at least one filter pattern. A bitstream
(Continued)

formatted to include encoded data, a computer-readable storage medium and a computer program product are also described.

17 Claims, 11 Drawing Sheets

(51) Int. Cl.
*H04N 19/70* (2014.01)
*H04N 19/80* (2014.01)
*H04N 19/174* (2014.01)

(56) References Cited

U.S. PATENT DOCUMENTS

| | | | |
|---|---|---|---|
| 6,549,674 | B1 | 4/2003 | Chui et al. |
| 7,319,494 | B2 | 1/2008 | Wredenhagen et al. |
| 7,590,288 | B1 | 9/2009 | Alvarez et al. |
| 8,295,607 | B1 | 10/2012 | Biswas et al. |
| 9,042,458 | B2 | 5/2015 | Gao et al. |
| 9,584,810 | B2 | 2/2017 | Kim et al. |
| 2003/0142750 | A1 | 7/2003 | Oguz et al. |
| 2004/0062307 | A1 | 4/2004 | Hallapuro et al. |
| 2007/0230564 | A1 | 10/2007 | Chen et al. |
| 2008/0304572 | A1 | 12/2008 | Murakami et al. |
| 2009/0067709 | A1 | 3/2009 | Gross et al. |
| 2010/0027897 | A1 | 2/2010 | Sole et al. |
| 2010/0289816 | A1 | 11/2010 | Au et al. |
| 2011/0026600 | A1 | 2/2011 | Kenji et al. |
| 2011/0096829 | A1 | 4/2011 | Han et al. |
| 2011/0243249 | A1 | 10/2011 | Lee et al. |
| 2012/0082224 | A1 | 4/2012 | Van Der et al. |
| 2012/0087595 | A1 | 4/2012 | Minezawa et al. |
| 2012/0148153 | A1 | 6/2012 | Kitamura et al. |
| 2012/0189064 | A1 | 7/2012 | Kossentini et al. |
| 2012/0201300 | A1 | 8/2012 | Kim et al. |
| 2012/0230413 | A1 | 9/2012 | Lou et al. |
| 2012/0281753 | A1* | 11/2012 | Misra .................. H04N 19/107 375/E7.193 |
| 2012/0321206 | A1 | 12/2012 | Sato et al. |
| 2013/0156096 | A1 | 6/2013 | Yang et al. |
| 2013/0156346 | A1 | 6/2013 | Lee et al. |
| 2014/0355695 | A1 | 12/2014 | Lim et al. |
| 2015/0003524 | A1 | 1/2015 | Yamamoto et al. |
| 2015/0365703 | A1 | 12/2015 | Puri et al. |
| 2017/0054976 | A1* | 2/2017 | Li ........................ H04N 19/157 |
| 2017/0150186 | A1 | 5/2017 | Zhang et al. |
| 2017/0237981 | A1 | 8/2017 | Karczewicz et al. |
| 2017/0238020 | A1 | 8/2017 | Karczewicz et al. |
| 2017/0332075 | A1 | 11/2017 | Karczewicz et al. |
| 2018/0041779 | A1 | 2/2018 | Zhang et al. |
| 2018/0077414 | A1 | 3/2018 | Reddy et al. |
| 2018/0176561 | A1 | 6/2018 | Kim et al. |
| 2018/0197276 | A1 | 7/2018 | Kim et al. |
| 2018/0199034 | A1 | 7/2018 | Nam et al. |
| 2018/0352225 | A1 | 12/2018 | Guo et al. |
| 2019/0075293 | A1 | 3/2019 | Lim et al. |
| 2019/0268593 | A1 | 8/2019 | Li et al. |
| 2020/0128243 | A1* | 4/2020 | Wang .................. H04N 19/159 |

OTHER PUBLICATIONS

Karczewicz, et al., "Study of coding efficiency improvements beyond HEVC", ISO/IEC JTC1/SC29/WG11 MPEG2015/M37102, Qualcomm Incorporated, Oct. 2015, Geneva, Switzerland, 13 pages.
Chen, et al., "Algorithm Description of Joint Exploration Test Model 3", JVET-C1001 V3, Joint Video Exploration Team (JVET) of ITU-T SG 16 WP3 and ISO/IEC JTC 1/SC 29/WG11, 3$^{rd}$ Meeting, Geneva, Switzerland, May 26, 2016-Jun. 1, 2016, 37 pages.
Ehsan, et al., "Parametric Adaptive Loop Filter", JCTVC-E320, Joint Collaborative Team on Video Coding (JCT-VC) of ITU-T SG16 WP3 and ISO/IEC JTC1/SC29/WG11 5$^{th}$ Meeting, Geneva, Switzerland, Mar. 16-23, 2011, 5 pages.
Chen, et al., "Algorithm Description of Joint Exploration Test Model 5 (JEM 5)", JVET-E1001-v2, Joint Video Exploration Team (JVET) of ITU-T SG 16 WP3 and ISO/IEC JTC 1/SC 29/WG11, 5$^{th}$ Meeting, Geneva, Switzerland, Jan. 12-20, 2017, 44 pages.
Strom, et al., "EE2-JVET-E0032 Bilateral filter Test 1, Test2", Ericsson, JVET-F0034, Joint Video Exploration Team (JVET) of ITU-T SG 16 WP3 and ISO/IEC JTC 1/SC 29/WG11, 6$^{th}$ Meeting, Hobart, AU, Mar. 31-Apr. 7, 2017, 7 pages.
Chia-Hung, et al., "Deblocking Filter by Color Psychology Analysis for H.264/AVC Video Coders", International Conference on Intelligent Information Hiding and Multimedia Signal Processing, IEEE DOI 10.1109/IIH-MSP, Dec. 2008, 4 pages.

* cited by examiner

METHOD AND APPARATUS FOR VIDEO ENCODING AND DECODING USING PATTERN-BASED BLOCK FILTERING

CROSS-REFERENCE TO RELATED APPLICATIONS

This application is a continuation of U.S. Ser. No. 16/645,468, filed Mar. 7, 2020, which is the National Stage entry under 35 U.S.C. § 371 of Patent Cooperation Treaty Application PCT/US2018/049733, filed Sep. 6, 2018, which claims priority from European Patent Application No. 17306162.3, filed Sep. 8, 2017, the entire disclosures of each of which are incorporated herein by reference.

TECHNICAL FIELD

The present embodiments generally relate to video encoding and decoding, particularly to pattern-based block filtering of reconstructed blocks.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

Post-filtering may be performed after reconstruction of the picture or image to smooth it and reduce noise and coding artifacts while preserving the edges. More recently, block filtering (or in-loop-block filtering) may be performed for each reconstructed block of the picture. FIG. 1 illustrates simplified flowcharts of methods of block filtering 100 versus post-filtering 150 of reconstructed blocks of a picture (or slice of a picture) according to the prior art. In post-filtering 150, the filtering 180 is performed on all (or a group of, e.g., a slice) blocks after all (or a group of) the blocks in the picture are accessed 160, decoded and reconstructed 170. In block filtering 100, each block is filtered 130 after being accessed 110, decoded and reconstructed 120.

The use of block filtering 100 results in some advantages. First, the filtered blocks may be used for predicting the next and/or neighboring blocks (Intra prediction), resulting in improved prediction. Second, the coding modes are chosen using rate-distortion optimization (RDO) on the filtered reconstructed blocks, after elimination of artifacts, resulting in improved selection.

One example of block filtering is a bilateral filter (BLF), which is a non-linear, edge-preserving, and noise-reducing smoothing filter for images. It replaces the intensity of a pixel with a weighted average of intensity values from nearby pixels. The weights may be based on a Gaussian distribution. The current Joint Video Exploration Team (JVET) Joint Exploration test Model (JEM) reference software ("Algorithm Description of Joint Exploration Test Model 5 (JEM 5)", by Jianle Chen et al.) utilizes bilateral filtering per block of the picture, more specifically, per coding unit (CU) (Document JVET-F0034, by J. Ström et al., entitled "EE2-JVET related: Division-free bilateral filter," JVET of ITU-T SG 16 WP 3 and ISO/IEC JTC 1/SC 29/WG 11, 6th Meeting: Hobart, AU, 31 Mar.-7 Apr. 2017).

FIG. 2 illustrates the filtering cross pattern per block 200 of the picture in accordance with the JVET-F0034 document of the prior art. For each pixel or sample inside the block (e.g., current pixel C 210), the BLF performs the filtering based on a specific neighboring shape consisting of four nearest neighbors (220-250) of the pixel (210) to filter on a cross (or plus, "+") pattern. The BLF computes a weighted sum of the four cross-patterned neighboring samples or pixels and the center or current pixel.

SUMMARY

According to an aspect of the present disclosure, a method of video encoding is provided including accessing a reconstructed block corresponding to a block in a picture of a video, determining at least one filter pattern based on a property of the block and filtering the reconstructed block according to the at least one filter pattern.

According to an aspect of the present disclosure, an apparatus for video encoding is provided, the apparatus including means for accessing a reconstructed block corresponding to a block in a picture of a video, means for determining at least one filter pattern based on a property of the block and means for filtering the reconstructed block according to the at least one filter pattern.

According to an aspect of the present disclosure, an apparatus for video encoding is provided, the apparatus including a processor, and at least one memory coupled to the processor, the processor being configured to access a reconstructed block corresponding to a block in a picture of a video, determine at least one filter pattern based on a property of the block and filter the reconstructed block according to the at least one filter pattern.

According to an aspect of the present disclosure, a bitstream formatted to include encoded data representative of a block of a picture, the encoded data encoded by accessing a reco-nstructed block corresponding to a block in a picture of a video, determining at least one filter pattern based on a property of the block and filtering the reconstructed block according to the at least one filter pattern.

According to an aspect of the present disclosure, a signal including a bitstream formatted to include encoded data representative of a block of a picture, the encoded data encoded by accessing a reconstructed block corresponding to a block in a picture of a video, determining at least one filter pattern based on a property of the block and filtering the reconstructed block according to the at least one filter pattern.

According to an aspect of the present disclosure, a method of video decoding is provided including accessing a reconstructed block corresponding to a block in a picture of an encoded video, determining at least one filter pattern based on a property of the block and filtering the reconstructed block according to the at least one filter pattern.

According to an aspect of the present disclosure, an apparatus for video decoding is provided, the apparatus including means for accessing a reconstructed block corresponding to a block in a picture of an encoded video, means for determining at least one filter pattern based on a property of the block and means for filtering the reconstructed block according to the at least one filter pattern.

According to an aspect of the present disclosure, an apparatus for video decoding is provided, the apparatus including a processor, and at least one memory coupled to the processor, the processor being configured to access a reconstructed block corresponding to a block in a picture of an encoded video, determine at least one filter pattern based on a property of the block and filter the reconstructed block according to the at least one filter pattern.

According to an aspect of the present disclosure, a computer program product is provided including program code instructions for accessing a reconstructed block corresponding to a block in a picture of a video, determining at least one filter pattern based on a property of the block and filtering the reconstructed block according to the at least one filter pattern.

According to an aspect of the present disclosure, a computer program product is provided including program code instructions for accessing a reconstructed block corresponding to a block in a picture of an encoded video, determining at least one filter pattern based on a property of the block and filtering the reconstructed block according to the at least one filter pattern.

According to an aspect of the present disclosure, a computer-readable storage medium carrying a software program is provided including program code instructions for accessing a reconstructed block corresponding to a block in a picture of a video, determining at least one filter pattern based on a property of the block and filtering the reconstructed block according to the at least one filter pattern.

According to an aspect of the present disclosure, a computer-readable storage medium carrying a software program is provided including program code instructions for accessing a reconstructed block corresponding to a block in a picture of an encoded video, determining at least one filter pattern based on a property of the block and filtering the reconstructed block according to the at least one filter pattern.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
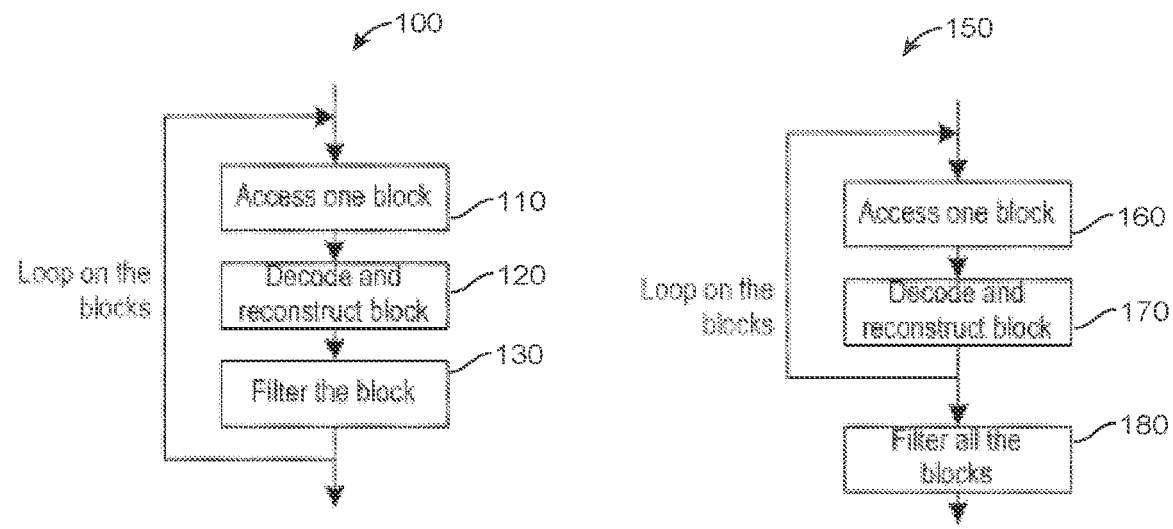
FIG. 1 illustrates simplified flowcharts of methods of block filtering (on the left) versus post-filtering (on the right) of reconstructed blocks of a picture in accordance with the prior art.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present disclosure, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

It is to be understood that a picture is an array of luma samples in monochrome format, or an array of luma samples and two corresponding arrays of chroma samples in 4:2:0, 4:2:2, and 4:4:4 color format. In HEVC, a "block" addresses a specific area in a sample array (e.g., luma Y), and a "unit" includes the collocated block of all encoded color components (luma Y and possibly chroma Cb and chroma Cr), syntax elements and prediction data that are associated with the block (e.g., motion vectors). However, the term "block" is more generally used herein to refer to a block (e.g. a coding block (CB), transform block (TB), coding group (CG), etc.) or a unit (e.g. a CU).

It is to be understood that a picture or block of pixels or transform coefficients is a two-dimensional array or matrix. The horizontal or x direction (or axis) represents a width and the vertical or y direction (or axis) represents a height. The indexes start at 0. The x direction represents columns and the y direction represents rows. The maximum x index is the width−1. The maximum y index is the height−1.

In the following sections, the word "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture" and "frame" may be used interchangeably. Furthermore, the words "coding", "source coding" and "compression" may be used interchangeably.

The present disclosure addresses some disadvantages present in the prior art. In the JVET-F0034 document of the prior art, the BLF computes a weighted sum of the four cross-patterned neighboring samples or pixels and the center or current pixel. However, while having a small complexity, a simple cross pattern may limit the number of samples used for filtering and, as a result, decrease the efficiency of the BLF. The present disclosure is directed to filtering patterns of neighboring samples used in block filtering (e.g., bilateral filtering) that take into consideration the different shapes and properties of the coding blocks. A pattern is a specific shape comprising a current sample to be filtered and neighboring samples, whose values are used as inputs for filtering the current sample. It can also be considered as the filter support.

Figure 3:
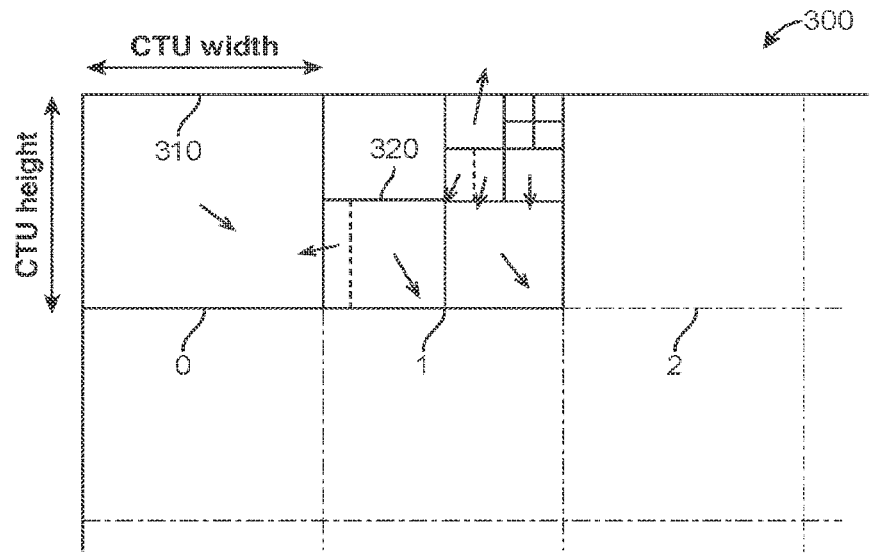
FIG. 3 illustrates a CTU split into CUs in accordance with the HEVC standard.
Figure 4:
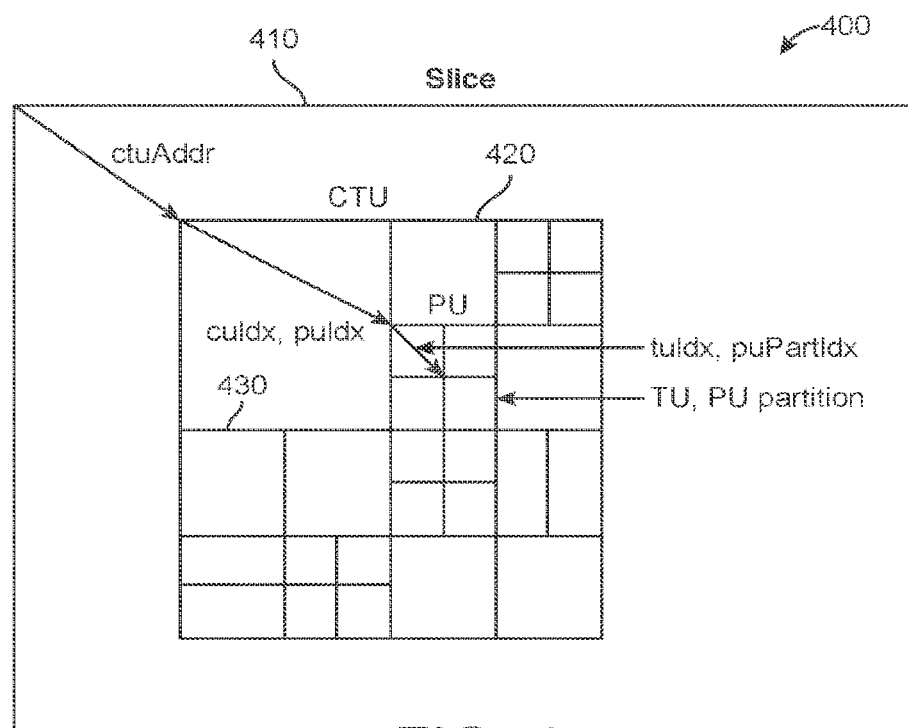
FIG. 4 illustrates the splitting of a CTU into CUs, PUs and TUs in accordance with the HEVC standard.

In the High Efficiency Video Coding (HEVC) standard ("ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), a picture is partitioned into coding tree units (CTU) of square shape with a configurable size typically 64×64, 128×128, or 256×256. As illustrated in FIG. 3, a CTU 310 is the root of a quad-tree partitioning into leaves called Coding Units (CU). For each CU, a prediction mode is signaled which indicates whether the CU is coded using intra or inter prediction. As illustrated in FIG. 4, a consecutive set of CTUs (e.g., CTU 420) may be grouped into a slice 410. A CU (e.g., CU 430) may be partitioned into one or more Prediction Units (PU) and forms the root of a quad-tree (known as transform tree) partitioning into Transform Units (TUs). Asymmetric subdivision of the CU into PUs is also possible in inter prediction, that is if a CU has a size N×N, a PU may have a size N/4×N, 3N/4×N, N×N/4, N×3N/4. Each PU is assigned some prediction information, for instance motion information, spatial intra prediction, etc.

Figure 5:
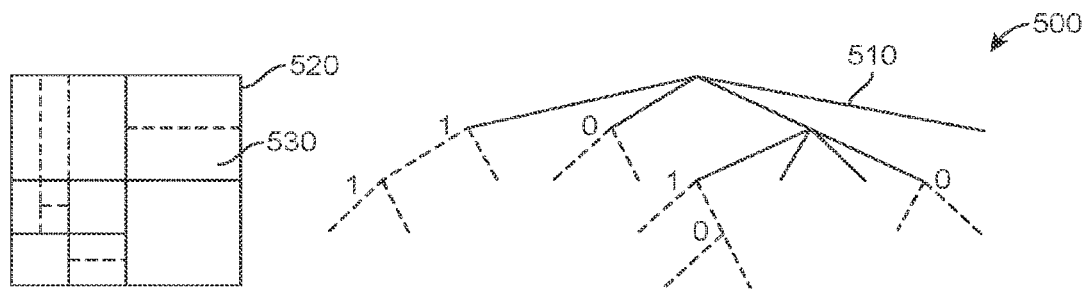
FIG. 5 illustrates a CTU in accordance with the QTBT tool.

The Quad-Tree plus Binary-Tree (QTBT) coding tool (Document JVET-C1001_v3, entitled "Algorithm Description of Joint Exploration Test Model 3", Joint Video Exploration Team of ISO/IEC JTC1/SC29/WG11, 3rd meeting, 26 May-1 Jun. 2015, Geneva, CH) is a new video coding tool that provides a more flexible CTU representation and increased compression efficiency compared to the CU/PU/TU arrangement of the HEVC standard. As illustrated in FIG. 5, the Quad-Tree plus Binary-Tree (QTBT) coding tool defines a coding tree 510 where coding units can be split both in a quad-tree and in a binary-tree fashion. An exemplary coding tree representation of a Coding Tree Unit 520 is illustrated in FIG. 5, where solid lines indicate quad-tree partitioning and dotted lines indicate binary partitioning of a CU 530 within CTU 520, which is spatially embedded in the quad-tree leaves.

The splitting of a CTU into coding units is decided on the encoder side, e.g. through a rate distortion optimization procedure which consists in determining the QTBT representation of the CTU with minimal rate distortion cost. In the QTBT representation, a CU has either a square or a rectangular shape. The size of a coding unit is always a power of 2, and typically goes from 4 to 128. The QTBT decomposition of a CTU comprises two stages: the CTU is first split into 4 CUs in a quad-tree fashion, then each quad-tree leaf can be further divided into two CUs in a binary fashion or into 4 CUs in a quad-tree fashion, as illustrated in FIG. 3.

With the QTBT representation, a CU may not be further partitioned into PUs or TUs. In other words, each CU is considered as a single prediction unit and a single transform unit and such a QTBT representation only allows for symmetric splitting of a CU. More recently, however, the EP application No. 16306308.4, filed on Oct. 5, 2016 and entitled "ENCODING AND DECODING METHODS AND CORRESPONDING DEVICES" describes CUs with new rectangular shapes which result from a new Binary Splitting Mode called asymmetric splitting mode.

The present disclosure is directed to techniques for video or image encoding and decoding (also known as source coding and decoding) where blocks of a plurality of shapes and splitting modes may be allowed in the video coding, that is, the encoder may choose any of these shapes and splitting modes and signal them to the decoder. The rich set of CU topologies result in coding structures that spatially match the structures and discontinuities contained in the images of a bitstream.

Encoding

Figure 6:
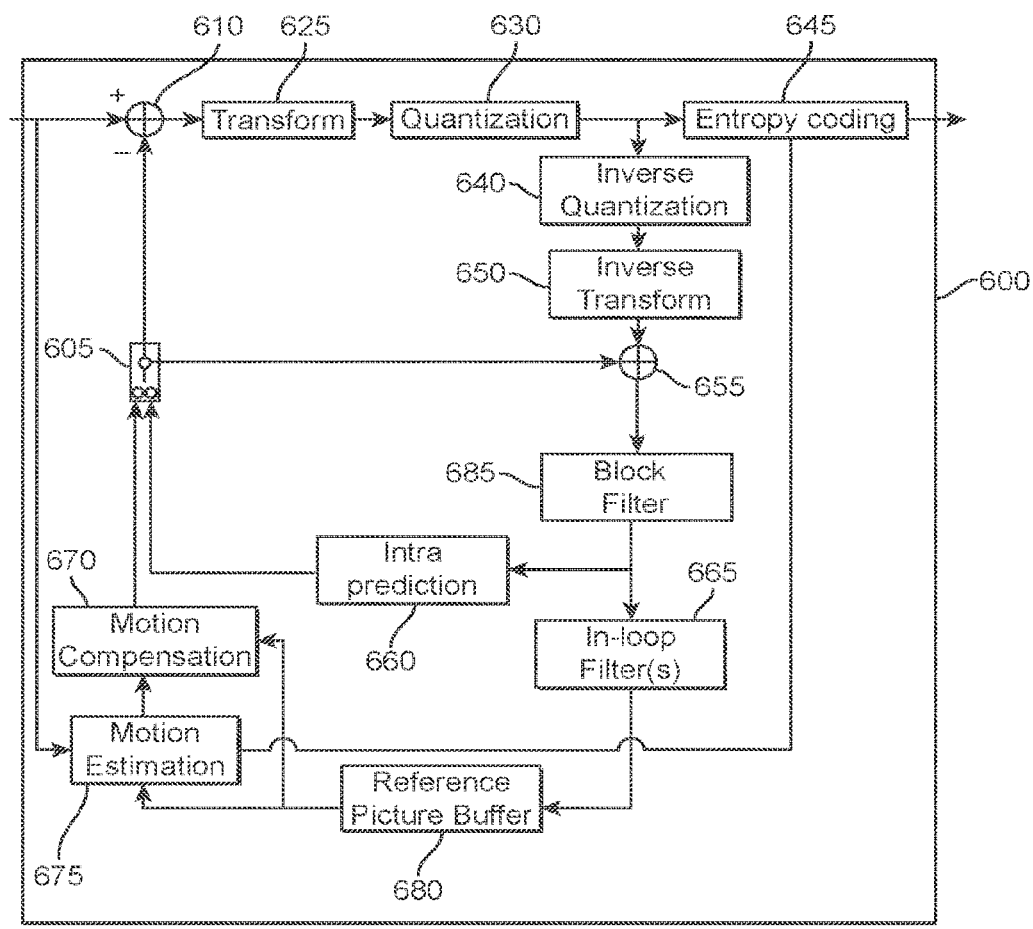
FIG. 6 illustrates a simplified block diagram of an exemplary video encoder in accordance with an embodiment of the present disclosure.

FIG. 6 illustrates a simplified block diagram of exemplary video encoder 600 in accordance with an embodiment of the present disclosure. The encoder 600 may be included in a transmitter or headend in a communication system. To encode a video sequence with one or more pictures, a picture may be partitioned into CTUs of square shape with a configurable size. A consecutive set of CTUs may be grouped into a slice. A CTU is the root of a QTBT partitioning into CUs. In the exemplary encoder 600, a picture is encoded by the encoder modules as described below. Each block is encoded using either an intra mode or inter mode. When a block is encoded in an intra mode, the encoder 600 performs intra prediction (module 660). In an inter mode, motion estimation (module 675) and compensation (module 670) are performed. The encoder decides (module 605) which one of the intra mode or inter mode to use for encoding the block, and indicates the intra/inter decision by a prediction mode flag. Residuals are calculated by subtracting (module 610) a predicted sample block (also known as a predictor) from the original image block.

As an example, blocks in intra mode are predicted from reconstructed neighboring samples. Inter prediction is performed by performing motion estimation (module 675) and motion-compensating (in module 670) a reference block stored in a reference picture buffer 680.

The residuals are transformed (module 625) and quantized (module 630). The transform module 625 may transform the image from the pixel or time domain to the transform or frequency domain. The transform may be may be, e.g., a cosine transform, a sine transform, a wavelet transform, etc. Quantization may be performed according to, e.g., a rate distortion criterion. The quantized transform coefficients, as well as motion vectors and other syntax elements, are entropy coded (module 645) to output a bitstream. The entropy coding may be, e.g., Context Adaptive Binary Arithmetic Coding (CABAC), Context Adaptive Variable Length Coding (CAVLC), Huffman, arithmetic, exp-Golomb, etc. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied and the block samples are directly coded into the bitstream.

The encoder comprises a decoding loop and thus decodes an encoded block to provide a reference for further predictions. The quantized transform coefficients are de-quantized (module 640) and inverse transformed (module 650) to decode residuals. An image block is reconstructed by combining (module 655) the decoded residuals and the predicted sample block. A block filter 685 may filter the reconstructed block (e.g., using a bilateral filter) after combiner (also called reconstruction module) 665. An in-loop filter(s) (i.e., a filter within the prediction loop, module 665) may be applied to the block filtered reconstructed picture, including, for example, to perform deblocking/Sample Adaptive Offset (SAO) filtering to reduce coding artifacts. In in-loop filtering, the filtering process may be performed, e.g., after an entire slice or image/picture/frame has been reconstructed, all-in-one, so that the filtered samples can be used for Inter-prediction. Hence, post-filtering 150 may be applied to in-filter(s) 665. Notice, however, that block filtering 100 may also be utilized in in-loop filter(s) 665. The filtered image is stored in the reference picture buffer 680.

The modules of video encoder 600 may be implemented in software and executed by a processor, or may be implemented by well-known circuits by one skilled in the art of compression. In particular, video encoder 600 may be implemented as an integrated circuit (IC).

The modules of video encoder 600 are also present in other video encoders (e.g., HEVC encoders), except for the differences described in the present disclosure, particularly, differences in the block sizes and shapes, and differences in the presence of block filter module 685, as will be described in greater detail in the following paragraphs and figures.

It is to be understood that, in additional (not shown) embodiments according to the present disclosure, block filter 685 may be placed in one of: inside the intra prediction module 660, inside in-loop filter(s) module 665, inside both the intra prediction module 660 and the in-loop filter(s) module 665, or inside the combiner module 655.

Figure 2:
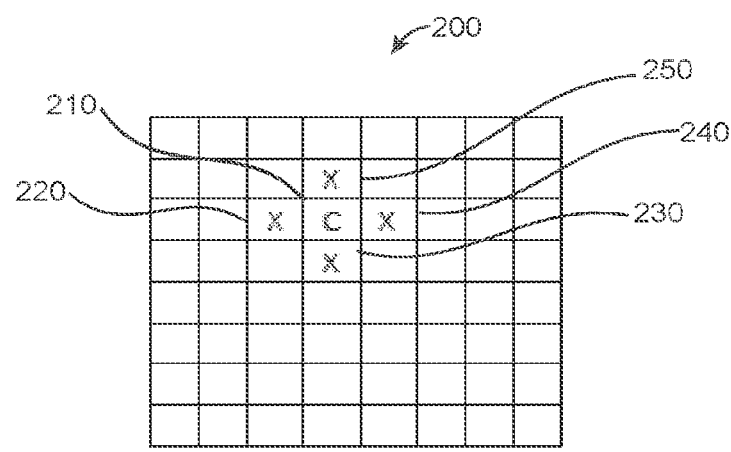
FIG. 2 illustrates a cross pattern of neighboring samples used in a bilateral filter in accordance with the prior art.

Regarding block filter module 685, in order to improve the performance of the video encoders, it has been proposed to filter the reconstructed signal with a filter that can reduce both the original signal noise (not predictable and not desirable to encode in general) and the reconstructed signal coding artifacts, while preserving the edges. The Bilateral-Filter (BLF) allows fulfilling these requirements. BLF works by basing the filter weights or taps not only on the distance to neighboring samples but also on their values. Each sample in the reconstructed picture is replaced by a weighted average of itself and its neighbors. The weights are calculated based on the distance from the center sample as well as the difference in sample values. Because the filter is in the shape of a small plus sign as shown in FIG. 2, all of the distances may be 0 or 1. In one embodiment according to the present disclosure, other values may be chosen with a proper scale factor.

In the JVET group, it has been shown that BLF may allow the Bjøntegaard Delta-Rate (BD-rate) gains about 0.41% in all intra (AI) and 0.48% in random access (RA) (Common Test Conditions) in Luminance, using the JEM reference encoder software.

However, one limitation of applying BLF on reconstructed blocks is its relative complexity. The BLF implies computing for each reconstructed (Luma) sample some weights associated with neighboring samples which are function of:

The distance of the neighboring samples (k,l) to the current sample (i,j) to filter
The difference of the current sample value I(i,j) and the neighboring sample values I(k,l)

A sample located at (i, j), will be filtered using its neighboring sample (k, l). The weight $\omega(i,j,k,l)$ is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

where $\sigma_d$ is the spatial parameter, and $\sigma_r$ is the range parameter. The properties (or strength) of the bilateral filter are controlled by the two parameters, $\sigma_d$ and $\sigma_r$. In the JEM reference software, $\sigma_d$ is set dependent on the transform unit size and prediction mode, and $\sigma_r$ is set based on the quantization parameter (QP) used for the current block.

The filtered samples $I_F$ (i, j) are calculated as:

$$I_F(i,j) = \Sigma_{k,l} I(k,l) * \omega(i,j,k,l) / \Sigma_{k,l} \omega(i,j,k,l) \quad (2)$$

The complexity due to accessing neighboring samples and in computing the weights may be alleviated by limiting the number of neighbors and tabulating the weights (using 1D-look up tables). In the NET-F0034 document, four neighbors only (plus or cross pattern in FIG. 2) were proposed so that the value of $(i-k)^2+(j-l)^2$ is equal to 1 and the number of tabulated values of $\|I(i, j)-I(k, l)\|^2$ can be reduced to the sample range values (1024 values for 10-bits).

Due to the fact that the filter only processes the current sample 210 and its four neighbours, equation 2 may be written as:

$$I_F(i,j) = (I_C\omega_C + I_L\omega_L + I_R\omega_R + I_A\omega_A + I_B\omega_B) / (\omega_C + \omega_L + \omega_R + \omega_A + \omega_B) \quad (3)$$

where $I_C$ is the intensity of the center sample 210, and $I_L$, $I_R$, $I_A$ and $I_B$ are the intensities for the left 220, right 240, above 250 and below 230 samples, respectively. Likewise, $\omega_C$ is the weight for the center sample 210, and $\omega_L$, $\omega_R$, $\omega_A$ and $\omega_B$ are the corresponding weights for the neighbouring samples 220, 240, 250 and 230, respectively. The filter only uses samples within the block for filtering—weights outside are set to 0.

The BLF allows for reducing the noise by averaging the current sample value 210 with neighboring sample values (220-250) when they are close. When the values of the neighbors are (very) different, the weights are small and their contribution is also small, so that the edges tend to be preserved. In the JVET-F0034 document, the process is applied systematically to all blocks, and to all pixels in the block, with a fixed filter shape.

The use of the cross pattern (samples 220-250) reduces the complexity but also limits the number of samples used for filtering, decreasing the efficiency of the BLF as a result. In particular, in the case of diagonal gradients, the neighbors whose values are close to the current sample value are not used in the cross pattern.

According to the present disclosure, pattern diversity is introduced for performing the block filtering 685 and for computing the filter weights. The pattern may be explicitly signaled in the stream, or it may be inferred or determined at the decoder depending on the characteristics of reconstructed samples, using pixel classification for instance. The pattern may be fixed for a current picture, for a current block, for all samples in a block, or may change for each picture, each block, each sub-block (e.g., 4×4 sub-block) and/or each sample in a block.

In the present disclosure, at least two steps are performed. A first step performs the pattern selection. Then the block filter 685 (e.g., BLF) is applied according to the selected pattern. The selection permits improving the performance of the overall video compression through improvement of the block filtering as a function of the signal characteristics.

Figure 7:
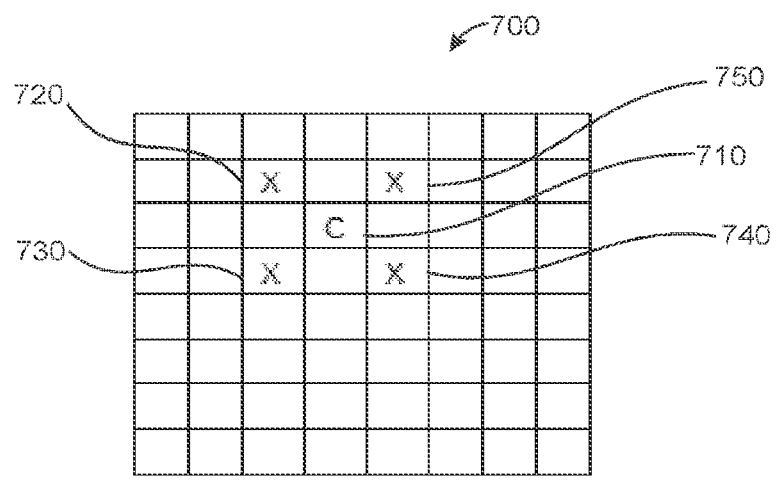
FIG. 7 illustrates a diagonal pattern of neighboring samples used in a filter in accordance with an embodiment of the present disclosure.

FIG. 7 illustrates a diagonal pattern of neighboring samples used in a filter in accordance with an embodiment of the present disclosure. The diagonal pattern has the shape of a symmetric "X", which represents the crossing of two block diagonals, a left leaning (or left) diagonal and a right leaning (or right) diagonal. In the diagonal pattern, the corners 720-750 of the current sample 710 may be the closest in value to the current sample 710 and are included in the weighted sum of the BLF.

Figure 8:
FIG. 8 illustrates a picture including blocks suited for a diagonal pattern of neighboring samples in accordance with an embodiment of the present disclosure.

The diagonal pattern re-uses most of the prior art block filtering operations in FIG. 1 and equations 1-3 taking the difference in pattern into consideration. The diagonal pattern is better suited for blocks containing local textures mostly oriented along diagonal directions, such as many portions of the picture 800 in FIG. 8. FIG. 8 is a picture from a reference sequence of Common Test Conditions used by the Moving Picture Experts Group (MPEG) body.

Both the cross and diagonal patterns use the same number of weighted samples (four) so that the complexity is the same as using only one single pattern. Consequently, the existing codec design can be maximally reused, with a small added complexity or implementational cost, where the added complexity is associated with the pattern selection process.

Figure 9A:
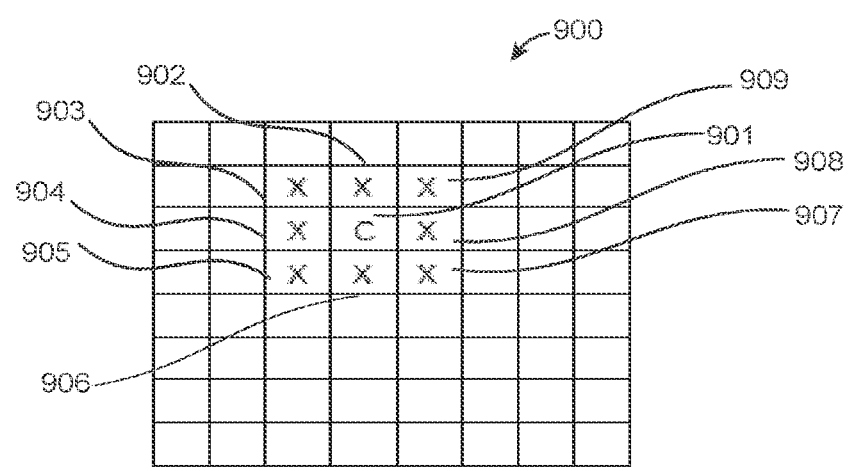
FIG. 9A illustrates a square pattern of neighboring samples used in a filter in accordance with an embodiment of the present disclosure.
Figure 9B:
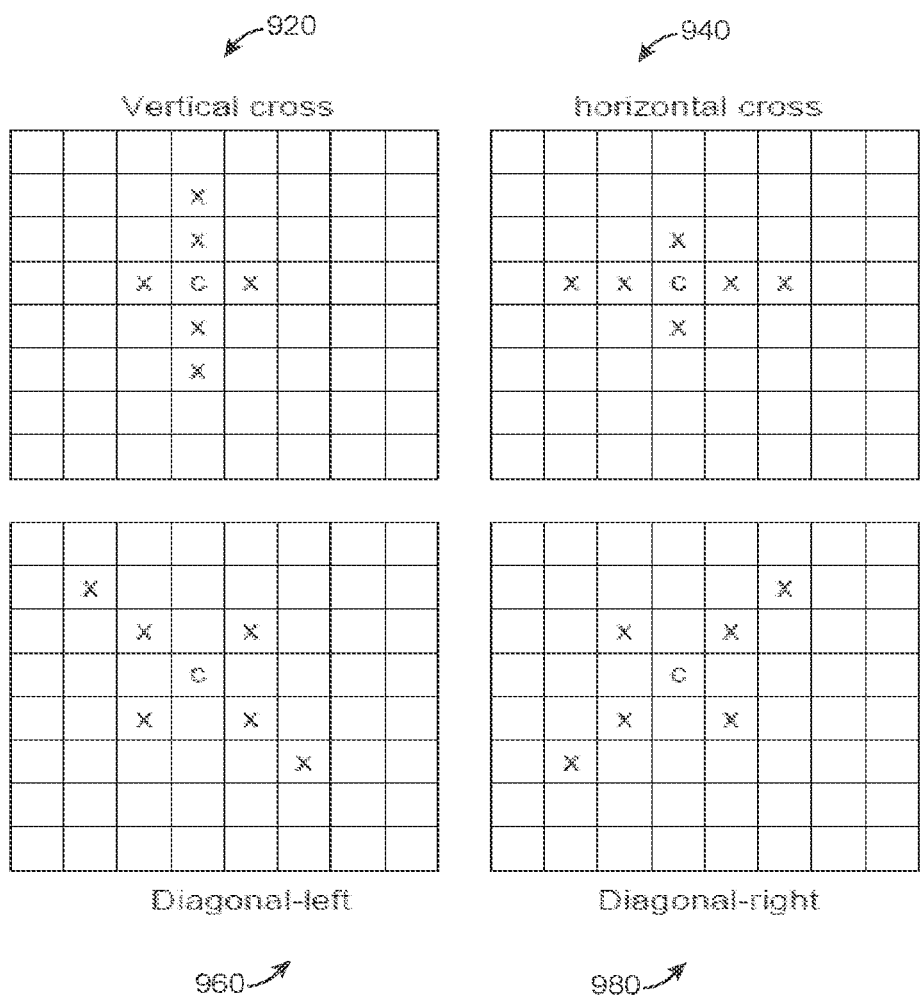
FIG. 9B illustrates a vertical-cross, a horizontal-cross, a diagonal-left and a diagonal-right pattern used in a filter in accordance with an embodiment of the present disclosure.

The selection may include selecting one of the cross pattern and the diagonal pattern. Other patterns may be considered, albeit with a higher complexity. For example, a square pattern may be included in the selection process. FIG. 9A illustrates a square pattern of neighboring samples for a block 900 in accordance with the present disclosure. The square pattern is a combination pattern and includes, for a current pixel 909, both the cross (902, 904, 906, 908) and diagonal patterns (901, 903, 905, 907) together. In one embodiment, other additional filter patterns may also be used. FIG. 9B illustrates a vertical-cross 920, a horizontal-cross 940, a diagonal-left 960 and a diagonal-right 980 patterns used in a filter in accordance with an embodiment of the present disclosure. The vertical-cross pattern 920 has the shape of an asymmetric cross for which the branch in the vertical direction or axis is longer. The horizontal-cross pattern 940 has the shape of an asymmetric cross for which the branch in the horizontal direction or axis is longer. The diagonal-left pattern 960 has the shape of an asymmetric "X", which is longer along the left leaning (or left) diagonal. The diagonal-right pattern 980 has the shape of an asymmetric "X", which is longer along the right leaning (or right) diagonal. In one embodiment, additional patterns which are a combination of any of the patterns in FIGS. 2, 7, 9A and 9B may be used. For example, a combination of the vertical-cross 920 and the diagonal 700 may be used.

In the JVET-F0034 document, pixels at the perimeter of the block include partial cross patterns in order to avoid using/processing samples outside the block, which may add complexity (e.g., memory, bandwidth access). Similarly, according to the present disclosure, perimeter pixels may utilize partial patterns, e.g., partial cross, partial diagonal and/or partial square patterns. In one embodiment, partial square patterns may be utilized in perimeter pixels of blocks for which interior pixels use a cross pattern and/or diagonal pattern. In one embodiment, partial square patterns are used for all perimeter pixels. In one embodiment, perimeter pixels process pixels from adjacent blocks resulting in added complexity.

Figure 10:
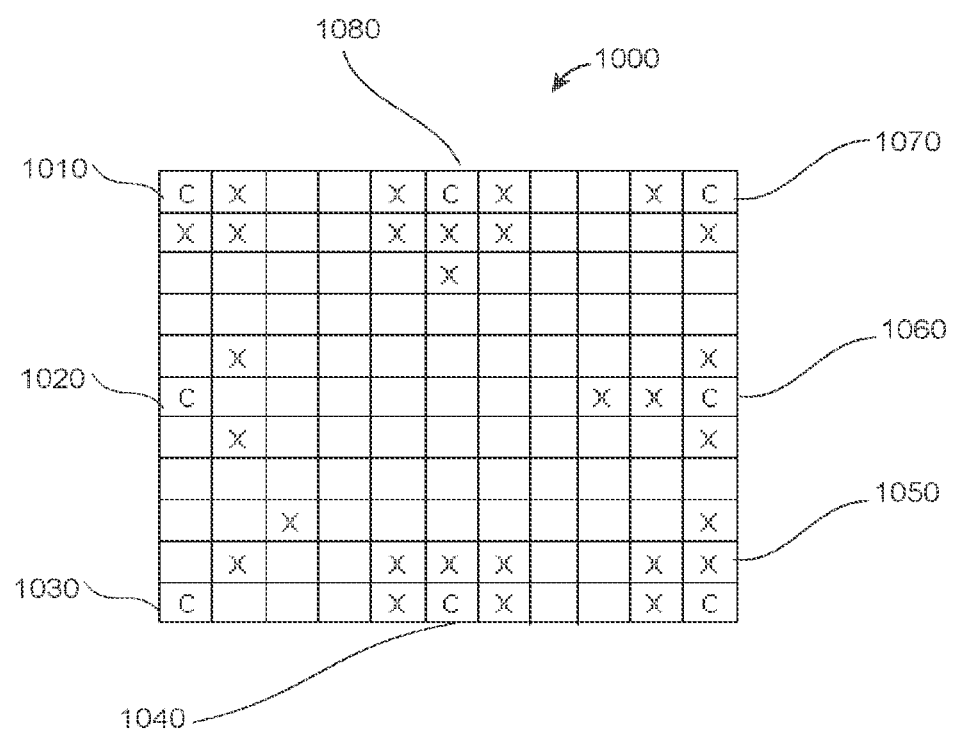
FIG. 10 illustrates some exemplary partial patterns of neighboring samples used in a filter in accordance with an embodiment of the present disclosure.

FIG. 10 illustrates some exemplary partial patterns of neighboring samples used in a filter in accordance with an embodiment of the present disclosure. In block 1000, the partial patterns are identified by the respective center perimeter pixel 1010-1080. Partial patterns 1010 and 1040 are partial square patterns; 1020, a partial diagonal pattern; 1030, a partial diagonal-right pattern; 1050 and 1080 are a partial combination of a diagonal and a vertical cross pattern; 1060 is a partial horizontal cross pattern and 1070 is a partial cross pattern. In one embodiment, additional patterns which are partial combinations of any of the patterns in FIGS. 2, 7, 9A and 9B may be used. It may be desirable to use as many partial combination patterns as possible (e.g., partial square pattern) in block 1000, in order to include more pixels in the filtering of perimeter pixels.

The filter pattern shape may vary per sequence, per picture, per slice or per block. Advantageously, the filter pattern shape may vary inside the block, per sample or per group of samples (e.g., 4×4 sub-block). The selection may be made at the encoder, for instance, based on the computation of the local reconstructed signal properties (such as the local gradients).

The local gradient parameters may be calculated as follows:

$$g_h = \Sigma_{(x,y) \, in \, D_h} |2*I(x,y) - I(x-1,y) - I(x+1,y)| \quad (4)$$

$$g_v = \Sigma_{(x,y) \, in \, D_v} |2*I(x,y) - I(x,y-1) - I(x,y+1)| \quad (5)$$

$$g_{d1} = \Sigma_{(x,y) \, in \, D_{d1}} |2*I(x,y) - I(x-1,y-1) - I(x+1,y+1)| \quad (6)$$

$$g_{d2} = \Sigma_{(x,y) \, in \, D_{d2}} |2*I(x,y) - I(x-1,y+1) - I(x+1,y-1)| \quad (7)$$

where $D_x(x)|_{x=h,v,d1,d2}$ is the domain on which the gradient $g_x$ is computed (e.g., the block).

The property derived from these parameters used for the selection may for instance be based on the following process:

i. If $(g_h + g_v) < \lambda * (g_{d1} + g_{d2})$ then the cross pattern is used; $\quad (8)$ ii. otherwise the diagonal pattern is used.

where λ is a given parameter. In one embodiment, λ may be, e.g., equal to 1.

In one embodiment, the property may be another function of the local gradients, e.g., a nonlinear function.

In one embodiment, λ may depend on the block shape and/or dimensions, for instance being lower for rectangular blocks (e.g. 8×2, 16×4) and larger for square blocks.

In one embodiment, λ may depend on decisions made for neighboring blocks. For example, if the neighboring blocks are coded with intra vertical direction, then the cross pattern is more likely to be chosen and λ may be increased. On another example, if the diagonal pattern is used for the neighboring blocks, then the diagonal pattern is more likely to be chosen and λ may be decreased.

In one embodiment, the selection of the filter pattern may further be a function of the block shape and/or dimensions. For example, some patterns may be enabled or forbidden depending on the block shape. Blocks may be classified according to their shape and/or dimensions, and for each shape/dimension, a predefined set of patterns is possible, as illustrated below:

Block class 1→set 1={pattern1, pattern2, pattern3, pattern4}
  Block class 2→set 2={pattern1, pattern3, pattern5}
  Block class 3→set 3={pattern3, pattern4}

For example, pattern 1 may be the cross pattern, pattern 2 may be the square pattern, pattern 3 may be the diagonal pattern, pattern 4 may be the partial square pattern and pattern 5 may be the partial cross pattern. For example, for square (4×4, 8×8, 16×16 . . . ) and thick rectangles (8×4, 4×8, 8×16, 16×8 . . . ), cross and diagonal patterns may be enabled, while for thin rectangular shapes/dimensions such as 8×2, 2×8, 16×4, 4×16, 4×32, 32×4, only the cross pattern may be enabled. In another example, considering the pattern shapes of FIG. 9b, for rectangular vertical large blocks (e.g., 4×16, 4×32, 8×32) the vertical cross shape may be enabled, for square and rectangular small blocks (e.g., 4×4, 8×8) cross and diagonal shapes may be enabled, for rectangular horizontal large blocks (e.g., 16×4, 32×4, 32×8) the horizontal cross shape may be enabled, for square and rectangular large blocks (e.g., 16×16, 32×32, 8×16, 16×8, 16×32, 32×16) vertical-cross, horizontal-cross, diagonal-left and diagonal-right may be enabled.

In one embodiment of the present disclosure, other types of filters with similar complexity may be utilized. In one embodiment, other types of nonlinear filters with similar complexity may be utilized. For example, a filter may have the same number of weights and use the same filter patterns as the BLF, but the weights may not necessarily satisfy equations 1 to 3 and may assume general values. In one embodiment, the weights may have equal values. In one embodiment, the weights may be power normalized such that the sum of their squares may be equal to 1.

In one embodiment, the filter pattern shape to use for filtering may be coded and/or included and/or signaled/identified in the bitstream as a syntax element or a group of syntax elements. The filter pattern may be coded for each picture (PPS), each slice (slice header) or for each block or group of blocks or CU depth (e.g., 64×64).

For instance, a syntax element called pattern_index may be coded per CU. When using two patterns, a flag may be used to differentiate the patterns.

In one embodiment, when more than 2 patterns exist and the current block has more than 2 neighbors, a merging process may be used to save coding bits. An example of syntax is given in Table 1, where the merging with a neighboring block may be utilized, that is, the pattern from a neighbor block may be reused for a current block. This case may be advantageous when the number of neighbors (M bit representation or up to $2^M$) is inferior to the number of patterns (N bit representation, or up to $2^N$), that is, M<N.

TABLE 1

| | num. bits |
|---|---|
| merge_flag | u1 |
| If (merge_flag) { | |

TABLE 1-continued

|  | num. bits |
|---|---|
| neighbor_index<br>pattern_to_use = neighbor_pattern_index<br>}<br>else {<br>pattern_index<br>pattern_to_use = pattern_index<br>} | uM<br><br><br><br>uN |

The syntax in Table 1 includes the merge_flag (1 bit) and either the neighbor_index (M bits) or the pattern_index (N bits). If merge_flag has a first value (e.g., the value of '1'), then merge_flag and neighbor_index are explicitly encoded (included and encoded) in the encoded bitstream. If merge_flag has a second value (e.g., the value of '0'), then merge_flag and pattern index are explicitly encoded in the bitstream. In one embodiment, at least one of the syntax elements are just included in the encoded bitstream but not encoded.

In one embodiment, other values of the merge_flag may be utilized, e.g., inverse values of merge_flag from the values used in Table 1. In one embodiment, merge_flag, neighbor_index and pattern index are included in the encoded bitstream. In one embodiment, merge_flag, neighbor_index and pattern index are explicitly encoded in the encoded bitstream. In one embodiment, at least one of the syntax elements are just included in the encoded bitstream but not encoded.

The 'neighbor_index' represents the position of one neighbor in the list. Typically, a list of neighbors is built. For example, neighbor_index=0 may represent a left neighbor block; neighbor_index=1 may represent above neighbor block; neighbor_index=2 may represent top-left neighbor block and neighbor_index=3 may represent top-right neighbor block. If one neighbor has the same pattern as another neighbor in the list, then it is removed from the list. Current block uses the same pattern (neighbor_pattern_index) as the one used by neighbor_index if merge_flag is equal to '1'. If merge_flag is equal to '0', then the pattern to use is pattern_index.

In one embodiment, when more than two patterns exist and the current block has only two neighbors (left and top), the syntax may be as shown in Table 2.

The syntax in Table 2 includes the merge_flag (1 bit) and either the left_flag (1 bit) or the pattern_index (N bits). If merge_flag has a first merge value (e.g., the value of '1'), then merge_flag and left_flag are explicitly encoded in the encoded bitstream. If merge_flag has a second merge value (e.g., the value of '0'), then merge flag and the pattern index are explicitly encoded in the bitstream. In one embodiment, at least one of the syntax elements are just included in the encoded bitstream but not encoded.

In addition, if the left_flag has a first left value (e.g., the value of '1'), then the left_pattern_index is to be chosen, that is, the pattern of the neighbor to the left of the block. If the left_flag has a second left value (e.g., the value of '0'), then the pattern of the neighbor on the top of the block is to be chosen.

In one embodiment, other values of merge_flag may be utilized, e.g., inverse values of merge_flag from the values used in Table 2. In one embodiment, other values of left_flag may be utilized, e.g., inverse values of left_flag from the values used in Table 2. In one embodiment, merge_flag, left_flag and pattern index are explicitly encoded in the encoded bitstream. In one embodiment, at least one of the syntax elements are just included in the encoded bitstream but not encoded.

Whether a syntax table according to Table 1 or Table 2 is included in the encoded bitstream for a block, at the decoder, the syntax table is recovered in order to identify the appropriate filter pattern for the block.

TABLE 2

|  | num. bits |
|---|---|
| merge_flag | u1 |
| If (merge_flag) {<br>  left_flag<br>  pattern_to_use = left_flag ?<br>  left_pattern_index : top_pattern_index<br>}<br>else {<br>  pattern_index<br>  pattern_to_use = pattern_index<br>} | <br>u1<br><br><br><br><br>uN |

Figure 11:
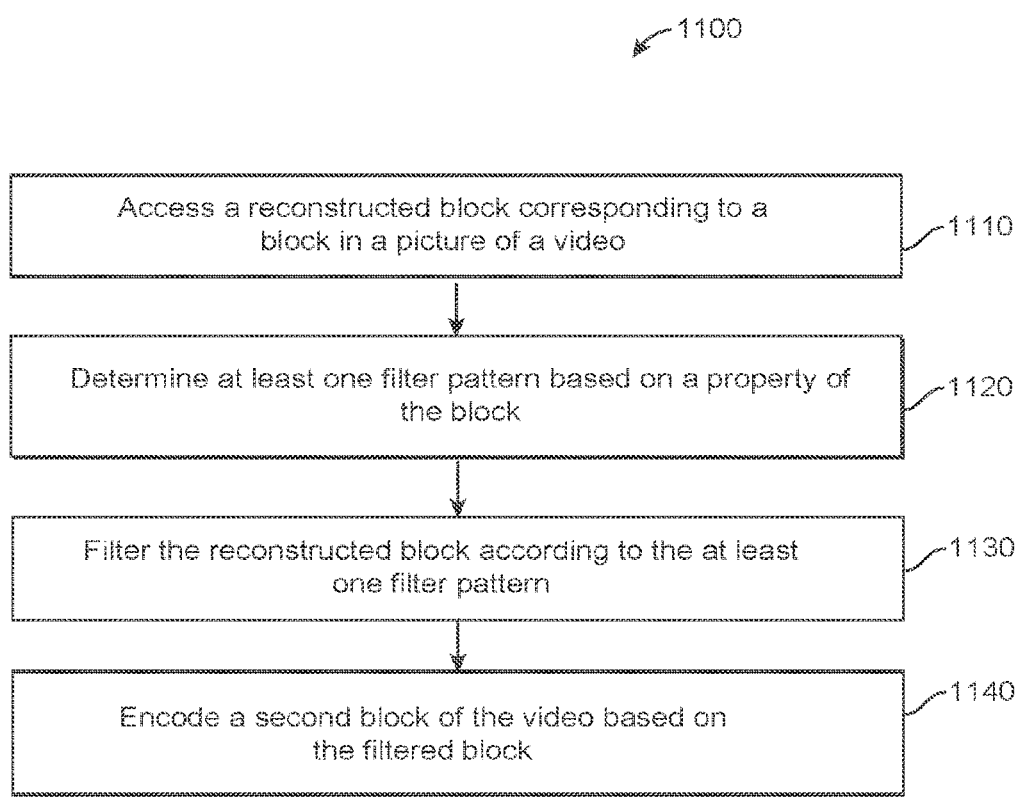
FIG. 11 illustrates a flowchart of an exemplary method of encoding in accordance with an embodiment of the present disclosure.

FIG. 11 illustrates a flowchart 1100 of an exemplary method of video encoding in accordance with one embodiment of the present disclosure. The method 1100 includes, at step 1110, accessing a reconstructed block corresponding to a block in a picture of a video. The picture may be alternately called first picture. Then, at step 1120, the method 1100 includes determining at least one filter pattern based on a property of the block. Moreover, at step 1130, the method 1100 includes filtering the reconstructed block according to the at least one filter pattern. Steps 1110 to 1130 may be performed, e.g., by encoder 600. In particular, steps 1120 and 1130 may be performed by, e.g., block filter 685.

According to one embodiment, at step 1140, the method 1100 may further include encoding a second block of the video based on the filtered block. The second block may be a second block of the picture (in the case of intra prediction) or a second block of a second picture of the video (in the case of intra prediction). Step 1140 may be performed, e.g., by encoder 600. In particular, step 1140 may be performed by at least one of intra-prediction module 660 and inter-prediction related modules 670, 675 and 680. Step 1140 of encoding may be optional, bypassed or removed, since it may be performed by another device.

According to one embodiment of the method, the property of the block may include a function of at least one local gradient for the reconstructed block. The local gradients may be determined according to, e.g., equations 4-7. The function may satisfy equation 8 (items i, ii).

According to one embodiment of the method, the property of the block may include a function of at least one local gradient for the reconstructed block at the video encoder. The local gradients may be determined according to, e.g., equations 4-7. The function may satisfy equation 8 (items i, ii).

According to one embodiment of the method, at least one syntax element indicating the filter pattern may be included in the encoded video. The syntax element(s) may be encoded or not encoded. The syntax element(s) may satisfy, e.g., Table 1 or Table 2.

According to one embodiment of the method, the at least one syntax element may be shared among one of a plurality of pixels in the block, a plurality of blocks in the picture, a plurality of slices in the picture and a plurality of pictures in the video. The syntax element(s) may satisfy, e.g., Table 1 or Table 2.

According to one embodiment of the method, the at least one filter pattern may be determined at the video decoder by retrieving the at least one syntax element from the encoded video. The syntax element(s) may satisfy, e.g., Table 1 or Table 2.

According to one embodiment of the method, the property of the block may further include a shape of the block.

According to one embodiment of the method, the property of the block may further include a function of a shape of the block.

According to one embodiment of the method, the filtering may be performed by a nonlinear filter. For example, the filter may be a bilateral filter of equations 1-3, or a modified version of the bilateral filter where the weights are based on a Gaussian distribution.

According to one embodiment of the method, the filtering may be performed by a bilateral filter. The bilateral filter may satisfy equations 1-3.

According to one embodiment of the method, the at least one filter pattern may be at least one of a cross pattern, a diagonal pattern, a square pattern, a partial cross pattern, a partial diagonal pattern and a partial square pattern.

According to one embodiment of the method, the at least one filter pattern may be at least one of a cross pattern, a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern and a partial diagonal-right pattern.

According to one embodiment of the method, the at least one filter pattern may be at least one of a cross pattern, a diagonal pattern and a square pattern when a pixel is an interior pixel of the block.

According to one embodiment of the method, the at least one filter pattern may be at least one of a partial cross pattern, a partial diagonal pattern and a partial square pattern when a pixel is a perimeter pixel of the block.

According to one embodiment of the method, the at least one filter pattern may be at least one of a cross pattern, a diagonal pattern, a square pattern, a horizontal-cross pattern, a vertical-cross pattern, a diagonal-left pattern and a diagonal-right pattern when a pixel is an interior pixel of the block.

According to one embodiment of the method, the at least one filter pattern may be at least one of a partial cross pattern, a partial diagonal pattern, a partial square pattern, a partial horizontal-cross pattern, a partial vertical-cross pattern, a partial diagonal-left pattern and a partial diagonal-right pattern when a pixel is a perimeter pixel of the block.

According to one embodiment of the method, the block may be reconstructed by accessing a transformed and quantized prediction residual associated with the block, reconstructing the residual by inverse quantizing and inverse transforming the residual and adding the reconstructed residual to a prediction for the block. The inverse quantizing, inverse transforming and reconstructing may be performed by, e.g., modules 640, 650 and 655 of encoder 600, respectively.

According to one embodiment of the method, the filtered block may be provided to a at least one of an intra prediction (e.g., module 660) and inter prediction (e.g., modules 665, 680 and 675) module.

According to one embodiment of the method, the filtered block may be provided to a reference picture buffer (e.g., module 680).

According to one embodiment of the method, the filtered block may be provided to an in-loop filter module (e.g., module 665).

According to one embodiment of the method, the filtered block may be provided as a decoded block at the encoder output.

According to one embodiment of the method, the filtered block may be provided to a reference picture buffer (e.g., module 680).

According to one embodiment, the method may further include receiving the picture, partitioning the picture into a plurality of blocks including the block, determining a prediction residual for the block, transforming and quantizing the residual to obtain a plurality of transform coefficients and entropy encoding the residual. The steps of transforming and quantizing may be performed by, e.g., modules 625 and 630 of encoder 600. The step of entropy encoding may be performed by, e.g., module 645 of encoder 600. The steps of receiving, transforming and quantizing may be optional, bypassed or removed, since they may have been previously performed by another device and/or the results may have been stored in memory.

It is to be understood that any of the embodiments of the method 1100 described above may be implemented by encoder 600. The blocks of encoder 600 may be implemented by hardware (e.g., integrated circuits) or in software, stored in memory and executed by a processor.

Decoding

Figure 12:
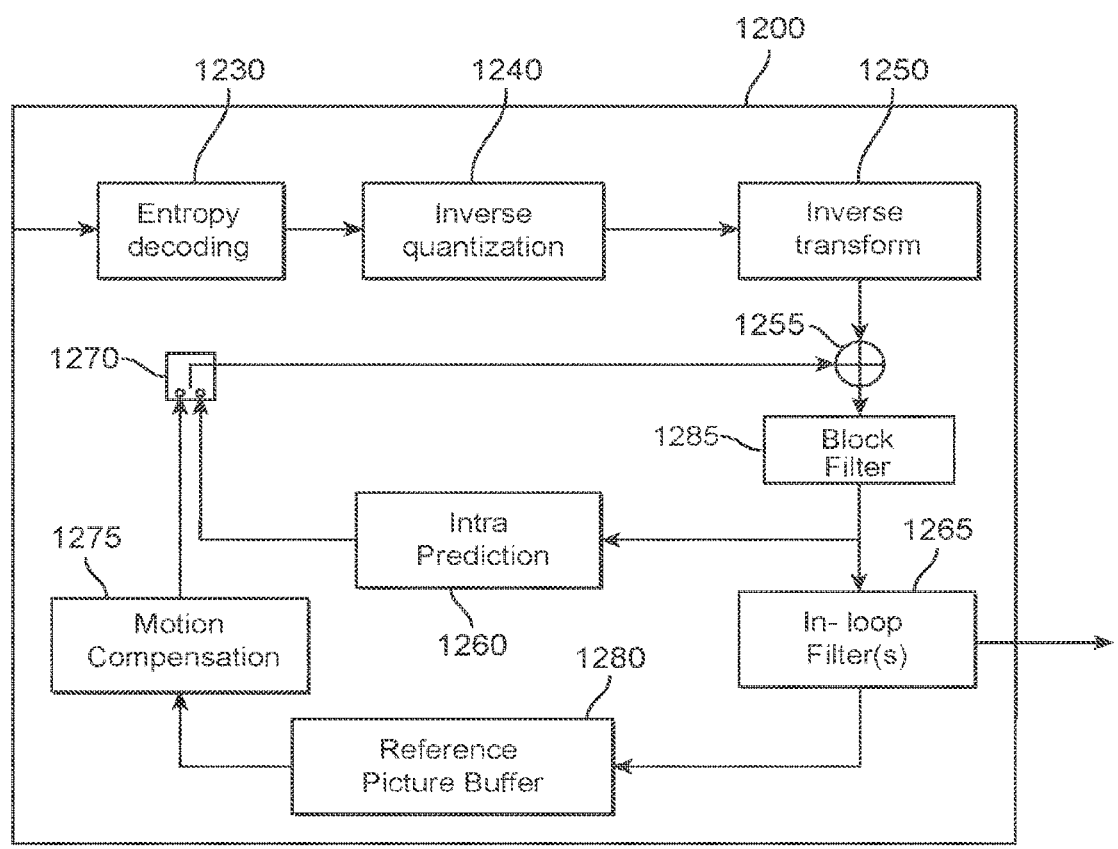
FIG. 12 illustrates a simplified block diagram of an exemplary video decoder in accordance with an embodiment of the present disclosure.

FIG. 12 illustrates a simplified block diagram of an exemplary video decoder 1200 in accordance with an embodiment of the present disclosure. The video decoder 1200 may be included in a receiver in a communication system. Video decoder 1200 generally performs a decoding pass reciprocal to the encoding pass performed by the video encoder 600 as described in FIG. 6. In particular, the input of the decoder 1200 includes a video bitstream, which may be generated by the video encoder 600. The bitstream is first entropy decoded (module 1230) to obtain transform coefficients, motion vectors, syntax elements and other coded information. The transform coefficients are de-quantized (module 1240) and inverse transformed (module 1250) to decode residuals. The decoded residuals are then combined (module 1255) with a predicted sample block (also known as a predictor) to obtain a decoded/reconstructed image block. The predicted sample block may be obtained (module 1270) from intra prediction (module 1260) or motion-compensated prediction (i.e., inter prediction) (module 1275). A block filter 1285 may filter the reconstructed block (e.g., using a bilateral filter) after combiner (also called reconstruction module) 1265. An in-loop filter (i.e., a filter within the prediction loop, module 1265) may be applied to the block filtered reconstructed slice or image/picture/frame. The in-loop filter may include a deblocking filter and a SAO filter. In in-loop filtering, the filtering process may be performed, e.g., after an entire slice or image/picture/frame has been reconstructed, all-in-one, so that the filtered samples can be used for Inter-prediction. Hence, post-filtering 150 may be applied to in-filter(s) 1265. Notice, however, that block filtering 100 may also be utilized in in-loop filter(s) 1265. The filtered image is stored in a reference picture buffer 1280.

The modules of video decoder 1200 may be implemented in software and executed by a processor, or may be implemented by well-known circuits by one skilled in the art of compression. In particular, video encoder 1200 may be implemented as an integrated circuit (IC), alone or combined with video decoder 600 as a codec.

The modules of video decoder 1200 are also present in other video decoders (e.g., HEVC decoders), except for the differences described in the present disclosure, particularly, differences in the block sizes and shapes, and differences in the presence of block filter module 685, as will be described in greater detail in the following paragraphs.

It is to be understood that, in additional (not shown) embodiments according to the present disclosure, block filter 685 may be placed in one of: inside the intra prediction module 660, inside in-loop filter(s) module 665, inside both the intra prediction module 660 and the in-loop filter(s) module 665, or inside the combiner module 655.

Since the decoder 1200 of the present disclosure also includes block filtering, all the embodiments of block filtering described associated with encoder 600 also apply for decoder 1200. In addition, when the filter pattern(s) is(are) encoded and/or included and/or signaled/identified in the bitstream as syntax element(s), the decoder may retrieve the syntax element(s) from the encoded bitstream in order to obtain the filter pattern prior to performing the block filtering, without the need for computation or selection.

In one embodiment, the computation associated with the filter pattern choice is also made at the decoder so that (the index of) the pattern to use is not coded but derived from reconstructed samples. In that case, the samples to use may not go outside the block to reduce bandwidth memory access. For instance, if gradients are computed at the decoder, only the pixels located inside the block are considered.

Figure 13:
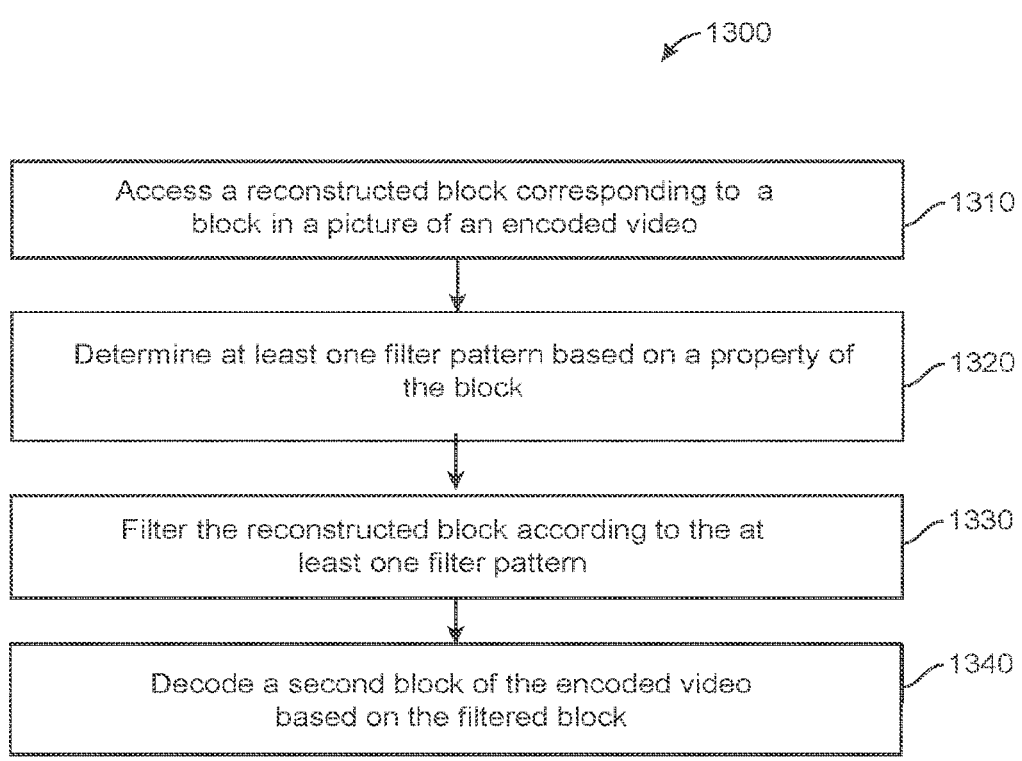
FIG. 13 illustrates a flowchart of an exemplary method of decoding in accordance with an embodiment of the present disclosure.

FIG. 13 illustrates a flowchart 1300 of an exemplary method of video decoding in accordance with one embodiment of the present disclosure. The method 1300 includes, at step 1310, accessing a reconstructed block corresponding to a block in a picture of an encoded video. The picture may be alternately called first picture. Then, at step 1320, the method 1300 includes determining at least one filter pattern based on a property of the block. Moreover, at step 1330, the method 1300 includes filtering the reconstructed block according to the at least one filter pattern. Steps 1310 to 1330 may be performed, e.g., by decoder 1200. In particular, steps 1320 and 1330 may be performed by, e.g., block filter module 1285.

According to one embodiment, at step 1340, the method 1300 may further include decoding a second block of the encoded video based on the filtered block. The second block may be a second block of the picture (in the case of intra prediction) or a second block of a second picture of the encoded video (in the case of inter prediction). Step 1140 may be performed, e.g., by encoder 600. In particular, step 1140 may be performed by at least one of intra-prediction module 1260 and inter-prediction related modules 1270, 1275 and 1280. Step 1140 of encoding may be optional, bypassed or removed, since it may be performed by another device.

According to one embodiment of the method, the property of the block may include a function of at least one local gradient for the reconstructed block at the video decoder, e.g., decoder 1200. The local gradients may be determined according to, e.g., equations 4-7. The function may satisfy equation 8 (items i, ii).

According to one embodiment of the method, the property of the block may include a function of at least one local gradient for the reconstructed block at a corresponding video encoder (e.g., encoder 600). The local gradients may be determined according to, e.g., equations 4-7. The function may satisfy equation 8 (items i, ii).

According to one embodiment of the method, at least one syntax element indicating the filter pattern may be included in the encoded video. The syntax element(s) may be encoded or not encoded. The syntax element(s) may satisfy, e.g., Table 1 or Table 2.

According to one embodiment of the method, the at least one syntax element may be shared among one of a plurality of pixels in the block, a plurality of blocks in the picture, a plurality of slices in the picture and a plurality of pictures in the video. The syntax element(s) may satisfy, e.g., Table 1 or Table 2.

According to one embodiment of the method, the at least one filter pattern may be determined at the video decoder by retrieving the at least one syntax element from the encoded video. The syntax element(s) may satisfy, e.g., Table 1 or Table 2.

According to one embodiment of the method, the property of the block may further include a shape of the block.

According to one embodiment of the method, the property of the block may further include a function of a shape of the block.

According to one embodiment of the method, the filtering may be performed by a nonlinear filter. For example, the filter may be a bilateral filter of equations 1-3, or a modified version of the bilateral filter where the weights are based on a Gaussian distribution.

According to one embodiment of the method, the filtering may be performed by a bilateral filter. The bilateral filter may satisfy equations 1-3.

According to one embodiment of the method, the at least one filter pattern may be at least one of a cross pattern, a diagonal pattern, a square pattern, a partial cross pattern, a partial diagonal pattern and a partial square pattern.

According to one embodiment of the method, the at least one filter pattern may be at least one of a cross pattern, a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern and a partial diagonal-right pattern.

According to one embodiment of the method, the at least one filter pattern may be at least one of a cross pattern, a diagonal pattern and a square pattern when a pixel is an interior pixel of the block.

According to one embodiment of the method, the at least one filter pattern may be at least one of a partial cross pattern, a partial diagonal pattern and a partial square pattern when a pixel is a perimeter pixel of the block.

According to one embodiment of the method, the at least one filter pattern may be at least one of a cross pattern, a diagonal pattern, a square pattern, a horizontal-cross pattern, a vertical-cross pattern, a diagonal-left pattern and a diagonal-right pattern when a pixel is an interior pixel of the block.

According to one embodiment of the method, the at least one filter pattern may be at least one of a partial cross pattern, a partial diagonal pattern, a partial square pattern, a partial horizontal-cross pattern, a partial vertical-cross pattern, a partial diagonal-left pattern and a partial diagonal-right pattern when a pixel is a perimeter pixel of the block.

According to one embodiment of the method, the block may be reconstructed by accessing a transformed and quantized prediction residual associated with the block, reconstructing the residual by inverse quantizing and inverse transforming the residual and adding the reconstructed residual to a prediction for the block. The inverse quantizing, inverse transforming and reconstructing may be performed by, e.g., modules 1240, 1250 and 1255, respectively.

According to one embodiment of the method, the filtered block may be provided to a at least one of an intra prediction (e.g., module 1260) and inter prediction (e.g., modules 1265, 1280 and 1275) module.

According to one embodiment of the method, the filtered block may be provided to a reference picture buffer (e.g., module 1280).

According to one embodiment of the method, the filtered block may be provided to an in-loop filter module (e.g., module 1265).

According to one embodiment of the method, the filtered block may be provided as a decoded block at the decoder output.

According to one embodiment, the method may further include receiving the encoded picture, entropy decoding the block, inverse transforming the block to obtain decoded residuals, combining the decoded residuals with a predicted sample block to obtain a decoded/reconstructed image block. The transform coefficients may be further inverse quantized prior to inverse transformed. The steps of entropy decoding, inverse transforming and inverse quantizing may be performed by, e.g., modules 1230, 1250 and 1240 of decoder 1200, respectively. The steps of receiving, entropy decoding, inverse transforming and inverse quantizing, and combining may be optional, bypassed or removed, since they may have been previously performed by another device and/or provided to another device, or the results may have been retrieved from and/or stored in memory.

It is to be understood that any of the embodiments of the method 1300 described above may be implemented by decoder 1200. The modules of decoder 1200 may be implemented by hardware (e.g., integrated circuits) or in software, stored in memory and executed by a processor.

Figure 14:
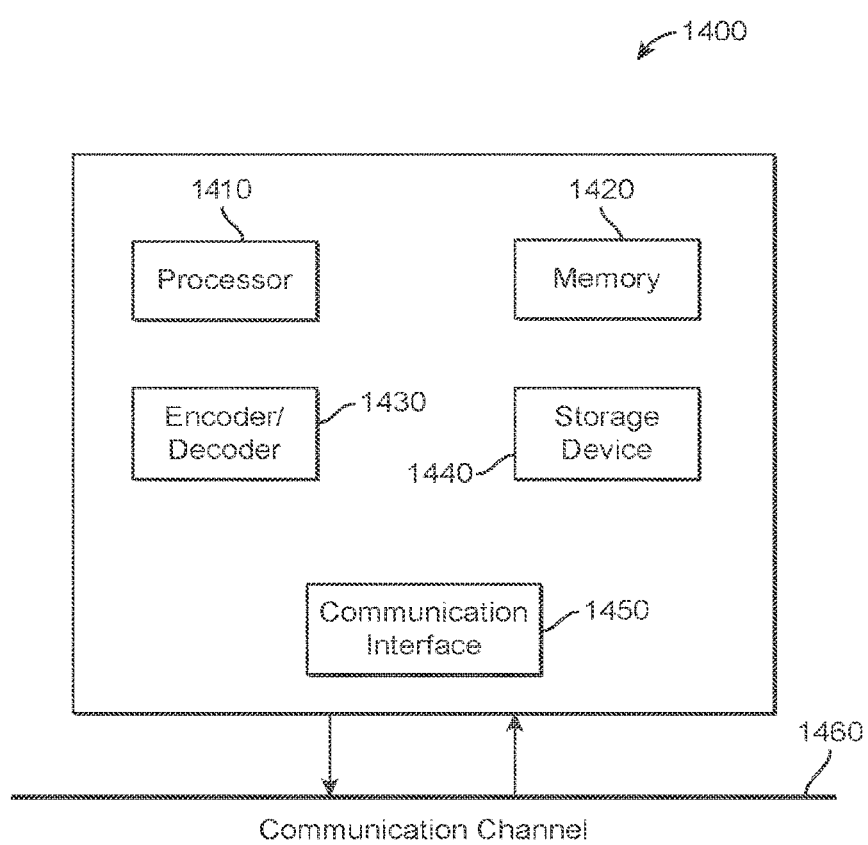
FIG. 14 illustrates a block diagram of a computing environment within which aspects of the present disclosure can be implemented and executed.

FIG. 14 illustrates a block diagram 1400 of an exemplary system in which various aspects of the exemplary embodiments of the present disclosure may be implemented. System 1400 may be embodied as a device including the various components described below and is configured to perform the processes described above. Examples of such devices, include, but are not limited to, personal computers, laptop computers, smartphones, smart watches, tablet computers, digital multimedia set top boxes, digital television receivers, personal video recording systems, connected home appliances, and servers. System 1400 may be communicatively coupled to other similar systems, and to a display via a communication channel as shown in FIG. 14 and as known by those skilled in the art to implement the exemplary video system described above. System 1400 may implement encoder 600, decoder 1200 or both, independently or jointly. Moreover, system 1400 may implement and be configured to execute any of the processes of the present disclosure, including method 1100 and/or 1300, independently or jointly.

The system 1400 may include at least one processor 1410 configured to execute instructions loaded therein for implementing the various processes as discussed above. Processor 1410 may include embedded memory, input output interface and various other circuitries as known in the art. The system 1400 may also include at least one memory 1420 (e.g., a volatile memory device such as RAM, a non-volatile memory device such as ROM). System 1400 may additionally include a storage device 1440, which may include non-volatile memory, including, but not limited to, an erasable programmable read-only memory (EPROM), ROM, a programmable read-only memory (PROM), a dynamic RAM (DRAM), a static RAM (SRAM), flash memory, magnetic disk drive, and/or optical disk drive. The storage device 1440 may comprise an internal storage device, an attached storage device and/or a network accessible storage device, as non-limiting examples. System 1400 may also include an encoder/decoder module 1430 configured to process data to provide an encoded video or decoded video.

Encoder/decoder module 1430 represents the module(s) that may be included in a device to perform the encoding and/or decoding functions, for example, according to FIGS. 6 and 12, respectively. As is known in the art of compression, a device may include one or both of the encoding and decoding modules. Additionally, encoder/decoder module 1430 may be implemented as a separate element of system 1400 or may be incorporated within processors 1410 as a combination of hardware and software as known to those skilled in the art. For example, encoder/decoder module 1430 may be implemented as one or two separate integrated circuits and/or field-programmable gate array (FPGA).

Program code to be loaded onto processors 1410 to perform the various processes described hereinabove may be stored in storage device 1440 and subsequently loaded onto memory 1420 for execution by processors 1410. In accordance with the exemplary embodiments of the present disclosure, one or more of the processor(s) 1410, memory 1420, storage device 1440 and encoder/decoder module 1430 may store one or more of the various items during the performance of the processes discussed herein above, including, but not limited to the input video, the decode video, the bitstream, equations, formula, matrices, variables, operations, and operational logic.

The system 1400 may also include communication interface 1450 that enables communication with other devices via communication channel 1460. The communication interface 1450 may include, but is not limited to a transceiver configured to transmit and receive data from communication channel 1460. The communication interface may include, but is not limited to, a modem or network card and the communication channel may be implemented within a wired and/or wireless medium. The various components of system 1400 may be connected or communicatively coupled together using various suitable connections, including, but not limited to internal buses, wires, and printed circuit boards.

The exemplary embodiments according to the present disclosure may be carried out by computer software executed by the processor 1410 or by hardware, or by a combination of hardware and software. As a non-limiting example, the exemplary embodiments according to the present disclosure may be implemented by one or more integrated circuits. The memory 1420 may be of any type appropriate to the technical environment and may be implemented using any appropriate data storage technology, such as optical memory devices, magnetic memory devices, semiconductor-based memory devices, fixed memory and removable memory, as non-limiting examples. The processor 1410 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present disclosure, an apparatus 1400 for video encoding is provided, the apparatus including a processor 1410, and at least one memory 1420, 1440 coupled to the processor, the processor 1410 being configured to perform any of the embodiments of the method of video encoding 1100 described above.

According to an aspect of the present disclosure, an apparatus 1400 for video decoding is provided, the apparatus including a processor 1410, and at least one memory 1420, 1440 coupled to the processor, the processor 1410 being configured to perform any of the embodiments of the method of video decoding 1300 described above.

According to an aspect of the present disclosure, an apparatus for video encoding is provided including means for accessing a reconstructed block corresponding to a block in a picture of a video, means for determining at least one filter pattern based on a property of the block and means for filtering the reconstructed block according to the at least one filter pattern. The apparatus may further include means for encoding a second picture of the video based on the filtered block. The video encoders of FIGS. 6 and 14 may include the structure or means of the apparatus, particularly, blocks 660, 665, 655, 670, 675, 680, 1410 and 1430. The apparatus for video encoding may perform any of the embodiments of the method 1100 of video encoding.

According to an aspect of the present disclosure, an apparatus for video decoding is provided including means for accessing a reconstructed block corresponding to a block in a picture of an encoded video, means for determining at least one filter pattern based on a property of the block and means for filtering the reconstructed block according to the at least one filter pattern The apparatus may further include means for decoding a second picture of the encoded video based on the filtered block. FIGS. 12 and 14 may include the structure or means of the apparatus for video decoding, particularly, blocks 1260, 1265, 1255, 1275, 1280, 1410 and 1430. The apparatus for video decoding may perform any of the embodiments of the method 1300 of video encoding.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to an aspect of the present disclosure, a signal including a bitstream formatted to include encoded data representative of a block of a picture, the encoded data encoded according to any of the embodiments of the method 1100 of video encoding.

According to an aspect of the present disclosure, a bitstream formatted to include encoded data representative of a block of a picture, the encoded data encoded according to any of the embodiments of the method 1100 of video encoding.

Moreover, any of the methods 1100 and/or 1300 may be implemented as a computer program product (independently or jointly) comprising computer executable instructions which may be executed by a processor. The computer program product having the computer-executable instructions may be stored in the respective transitory or non-transitory computer-readable storage media of the system 1400, encoder 600 and/or decoder 1200.

According to an aspect of the present disclosure, a computer program product is provided including program code instructions for performing any of the embodiments of any of the methods 1100 and/or 1300 (independently or jointly) of the present disclosure.

It is important to note that one or more of the elements in the processes 1100 and/or 1300 may be combined, performed in a different order, or excluded in some embodiments while still implementing the aspects of the present disclosure. Other steps may be performed in parallel, where the processor does not wait for a full completion of a step before starting another.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present disclosure, a computer-readable storage medium carrying a software program is provided including program code instructions for performing any of the embodiments of any of the methods of the present disclosure, including methods 1100 and/or 1300.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present disclosure or its claims may refer to "determining" various pieces of information. Determining the information may include one or more of, for example, estimating the information, calculating the information, predicting the information, or retrieving the information from memory.

Also, the present disclosure or its claims may refer to "providing" various pieces of information. Providing the information may include one or more of, for example, outputting the information, storing the information, transmitting the information, sending the information, displaying the information, showing the information, or moving the information.

Moreover, the present disclosure or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the present disclosure or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method of video encoding comprising:
accessing a reconstructed block corresponding to a block in a picture of a video;
determining one filter pattern defining a support of an in-loop filter for at least one sample of said reconstructed block in function of at least one local gradient computed for said at least one sample, said one filter pattern being a cross pattern in the case where a sum of horizontal and vertical gradients is below a weighted sum of diagonal gradients and being another filter pattern of a plurality of filter patterns otherwise; and
filtering said at least one sample using said in-loop filter.

2. The method of claim 1, wherein the another filter pattern is a diagonal pattern.

3. The method of claim 1, wherein at least one syntax element indicating said one filter pattern is included in the encoded video, said at least one syntax element being shared among one of a plurality of pixels in said block, a plurality of blocks in said picture, a plurality of slices in said picture and a plurality of pictures in said video.

4. The method of claim 1, wherein said plurality of filter patterns comprises at least two filter patterns among a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern, and a partial diagonal-right pattern.

5. An apparatus for video encoding comprising:
electronic circuitry adapted for:
accessing a reconstructed block corresponding to a block in a picture of a video;
determining one filter pattern defining a support of an in-loop filter for at least one sample of said reconstructed block in function of at least one local gradient computed for said at least one sample, said one filter pattern being a cross pattern in the case where a sum of horizontal and vertical gradients is below a weighted sum of diagonal gradients and being another filter pattern of a plurality of filter patterns otherwise; and
filtering said at least one sample using said in-loop filter.

6. The apparatus of claim 5, wherein the another filter pattern is a diagonal pattern.

7. The apparatus of claim 5, wherein at least one syntax element indicating said one filter pattern is included in the encoded video, said at least one syntax element being shared among one of a plurality of pixels in said block, a plurality of blocks in said picture, a plurality of slices in said picture and a plurality of pictures in said video.

8. The apparatus of claim 5, wherein said plurality of filter patterns comprises at least two filter patterns among a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern, and a partial diagonal-right pattern.

9. A method of video decoding comprising:
  accessing a reconstructed block corresponding to a block in a picture of an encoded video;
  determining one filter pattern defining a support of an in-loop filter for at least one sample of said reconstructed block in function of at least one local gradient computed for said at least one sample, said one filter pattern being a cross pattern in the case where a sum of horizontal and vertical gradients is below a weighted sum of diagonal gradients and being another filter pattern of a plurality of filter patterns otherwise; and
  filtering said at least one sample using said in-loop filter.

10. The method of claim 9, wherein the another filter pattern is a diagonal pattern.

11. The method of claim 9, wherein at least one syntax element indicating said one filter pattern is included in the encoded video, said at least one syntax element being shared among one of a plurality of pixels in said block, a plurality of blocks in said picture, a plurality of slices in said picture and a plurality of pictures in said video.

12. The method of claim 9, wherein said plurality of filter patterns comprises at least two filter patterns among a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern, and a partial diagonal-right pattern.

13. An apparatus for video decoding comprising:
  electronic circuitry adapted for:
    accessing a reconstructed block corresponding to a block in a picture of an encoded video;
    determining one filter pattern defining a support of an in-loop filter for at least one sample of said reconstructed block in function of at least one local gradient computed for said at least one sample, said one filter pattern being a cross pattern in the case where a sum of horizontal and vertical gradients is below a weighted sum of diagonal gradients and being another filter pattern of a plurality of filter patterns otherwise; and
    filtering said at least one sample using said in-loop filter.

14. The apparatus of claim 13, wherein the another filter pattern is a diagonal pattern.

15. The apparatus of claim 13, wherein at least one syntax element indicating said one filter pattern is included in the encoded video, said at least one syntax element being shared among one of a plurality of pixels in said block, a plurality of blocks in said picture, a plurality of slices in said picture and a plurality of pictures in said video.

16. The apparatus of claim 13, wherein said one filter pattern is further determined in function of at least one of the shape and size of said reconstructed block.

17. The apparatus of claim 13, wherein said plurality of filter patterns comprises at least two filter patterns among a diagonal pattern, a square pattern, a horizontal-cross pattern, a vertical-cross pattern, a diagonal-left pattern, a diagonal-right pattern, a partial cross pattern, a partial diagonal pattern, a partial square pattern, a partial horizontal-cross pattern, a partial vertical-cross pattern, a partial diagonal-left pattern, and a partial diagonal-right pattern.

* * * * *